US008516202B2

(12) United States Patent
Heller, Jr.

(10) Patent No.: US 8,516,202 B2
(45) Date of Patent: Aug. 20, 2013

(54) HYBRID TRANSACTIONAL MEMORY SYSTEM (HYBRIDTM) AND METHOD

(75) Inventor: Thomas J. Heller, Jr., Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 12/619,093

(22) Filed: Nov. 16, 2009

(65) Prior Publication Data

US 2011/0119452 A1    May 19, 2011

(51) Int. Cl.
*G06F 12/00* (2006.01)
(52) U.S. Cl.
USPC ........................................ 711/152; 711/145
(58) Field of Classification Search
USPC ................................. 711/152, 145
See application file for complete search history.

(56) References Cited

U.S. PATENT DOCUMENTS

| | | | |
|---|---|---|---|
| 6,401,110 B1* | 6/2002 | Freitas et al. ................. | 718/104 |
| 7,395,382 B1 | 7/2008 | Moir | |
| 2003/0004952 A1* | 1/2003 | Nixon et al. .................... | 707/10 |
| 2007/0198521 A1 | 8/2007 | McKenney | |
| 2008/0022054 A1 | 1/2008 | Hertzberg et al. | |
| 2008/0148262 A1 | 6/2008 | Dice | |
| 2008/0288727 A1 | 11/2008 | Heller, Jr. et al. | |
| 2008/0288730 A1 | 11/2008 | Heller, Jr. et al. | |
| 2009/0077339 A1* | 3/2009 | Hertzberg et al. ............ | 711/170 |
| 2009/0172299 A1* | 7/2009 | Goodman et al. ............ | 711/147 |
| 2009/0172306 A1 | 7/2009 | Nussbaum et al. | |
| 2010/0332538 A1* | 12/2010 | Gray et al. .................... | 707/774 |

OTHER PUBLICATIONS

"Early Experience with a Commercial Hardware Transactional Memory Implementation", Dice et al., Copyright is held by Sun Microsystems, Inc., ASPLOS'09, Mar. 7-11, 2009, Washington, DC, USA, ACM 978-60558-215-03/09/03. 12 pages.
"Hybrid Transactional Memory", Mark Moir, Sun Microsystems Laboratories 1 Network Drive, UBUR02-311 Burlington, MA 01803, Jul. 2005, 15 pages.
Manchester 1824, School of Computer Science Intranet, Research in Transactional Memory, Feb. 7, 2009 http://intranet.cs.man.ac.uk/apt/projects/TM/.

(Continued)

*Primary Examiner* — Hashem Farrokh
(74) *Attorney, Agent, or Firm* — Cantor Colburn LLP; John Campbell

(57) ABSTRACT

A computer processing system having memory and processing facilities for processing data with a computer program is a Hybrid Transactional Memory multiprocessor system with modules 1 . . . n coupled to a system physical memory array, I/O devices via a high speed interconnection element. A CPU is integrated as in a multi-chip module with microprocessors which contain or are coupled in the CPU module to an assist thread facility, as well as a memory controller, cache controllers, cache memory, and other components which form part of the CPU which connects to the high speed interconnect which functions under the architecture and operating system to interconnect elements of the computer system with physical memory, various I/O, devices and the other CPUs of the system. The current hybrid transactional memory elements support for a transactional memory system that has a simple/ cost effective hardware design that can deal with limited hardware resources, yet one which has a transactional facility control logic providing for a back up assist thread that can still allow transactions to reference existing libraries and allows programmers to include calls to existing software libraries inside of their transactions, and which will not make a user code use a second lock based solution.

15 Claims, 6 Drawing Sheets

(56) References Cited

OTHER PUBLICATIONS

SpingerLink, "SAPMTM: A Novel ScratchPad Memory Based Hybrid Nested Transactional Memory Framework", Feng et al., Springer Berlin/Heidelberg Publisher, Copyright 2009, ISBN 978-3-642-03643-9, Aug. 21, 2009 http://www.springerlink.com/content/y360105j5x52384k/.

ScienceDirect, "Executing Java programs with transactional memory", Carlstrom et al., vol. 63, Issue 2, Dec. 1, 2006 http://www.sciencedirect.com/science?_ob=ArticleURL&udi=B6V17-4KJV2Y4-1&use.

Tera-scale Computing Research Program, [online]; [retrieved on Nov. 3, 2009]; retrieved from the Internet http://techresearch.intel.com/articles/Tera-Scale/1421.htm Tera-scale Computing Research Program, "Taking multi-core hardware and software to a whole new dimension" 2009, pp. 1-3.

* cited by examiner

NESTED
{
TBEGIN A
INSTRUCTION A0
INSTRUCTION A1
TBEGIN B
INSTRUCTION B0
INSTRUCTION B1
TEND B
INSTRUCTION A2
TEND A
}

| PAGE (310) | A ID:fav (320a) | A r/w: LINE# (330a) | B ID:fav (320b) | B r/w: LINE# (330b) | C ID:fav (320c) | C r/w: LINE# (330c) | ⋮ | | | | | |
|---|---|---|---|---|---|---|---|---|---|---|---|---|
| n0000 | 3048:0 | 0:21 | 7621:0 | 0:22 | | | | | | | | |
| n0001 | | | | | | | | | | | | |
| n0010 | | | | | | | | | | | | |
| n0011 | 1205:0 | 1 | | | | | | | | | | |
| n0100 | | | | | | | | | | | | |
| n0101 | ∘ ∘ ∘ | | | | | | | | | | | |
| n0110 | | | | | | | | | | | | |
| yyyyy | | | | | | | | | | | | |

FIG.5

HYBRID TRANSACTIONAL MEMORY SYSTEM (HYBRIDTM) AND METHOD

BACKGROUND OF THE INVENTION

1. Field of the Invention

This invention relates to a computer processing system for transactional memory operations, and in particular to a Hybrid Transactional Memory System (Hybrid™)

2. Description of Background

Multicore microprocessors, as Intel's and AMD's dual core and quad core chips or Sun Microsystems's Niagara or RockH™, known as HTMs using large numbers of hardware threads of execution are currently being used in computing servers. The server software industry is moving towards new programming techniques to increase the concurrency of existing software in order to allow applications to take advantage of the large number of threads.

A Hybrid Transactional Memory System (Hybrid™) has been thought to provide a good tradeoff between hardware complexity and cost vs. overall system performance when executing transactions.

Most existing Hybrid™ systems provide hardware support as a Hardware Transactional Memory (HTM) like the illustrated CPU microprocessor core element in FIG. 1 of this application for some transactions and use a Software Transactional Memory (STM) system to handle others. To be cost effective, the hardware is limited in the number of storage location that can be tracked. An example of a Hybrid™ system is one which can execute short transactions very quickly using a small amount of hardware but uses an STM system for long transactions that contain many storage references. The hardware may also be limited in the types of system operations that can be used while executing a transaction. These limitations cause some transaction to fail repeatedly. Hybrid™ systems must deal with these failures in some manner.

A significant drawback of these Hybrid™ systems is the fact that only code that has been generated by a Transactional Memory capable compiler can be used. The code inside of transactions needs to be instrumented with calls to the STM software interface and therefore must be compiled together with STM in order to know which loads and stores should be instrumented. Dynamically compiled code can get around this limitation but carries other limitations related to speed and efficiency of compilation. Another drawback is that existing STM implementations have very long pathlengths and are therefore slow. This becomes a performance problem for applications which use Transactional Memory and fall back to the STM support often. Nevertheless, most recently Hybrid™ systems have been developed which exploit STM on HTM systems and provide for executing, one or more transactions in a first transactional memory mode while all transactions executed in the execution environment are executed according to a particular transactional memory implementation; and they try to dynamically transition to a second transactional memory mode during runtime; executing one or more transactions in the second transactional memory mode, while in said second transactional memory mode all transactions are executed according to a different transactional memory implementation than in the first transactional memory mode; where either the particular transactional memory implementation or the different transactional memory implementation is a hybrid transactional memory implementation in which some conflicts in the shared transactional memory space between transactions are resolved by a full STM software implementation without hardware support and other conflicts in the shared transactional memory space between transactions are resolved by a HTM hardware implementation.

Another alternative type of Hybrid™ system is one that doesn't require a full STM system. In this alternative the software programmer is required to provide both a Transactional Memory software path and an additional lock based path for their code. If a transaction fails repeatedly, the system forces the use of the lock based path. Although this type of system does allow the use of a limited hardware transactional memory (HTM) design, it is not desirable to build a lock based path for all the transactional code.

A third method of providing a backup for a hardware transactional memory HTM system that provides limited hardware resources. It has been suggested that the HTM system can "stop the world" and let one problem transaction run by itself. This has been referred to as granting one "favored" transaction. This solution will not work well for systems that provide dozens of threads of execution.

SUMMARY OF THE INVENTION

The current invention uses a combination of hardware and software to provide improved support for a transactional memory system that has a simple/cost effective hardware design that can deal with limited hardware resources, yet one which has a back up that can still allow transactions to reference existing libraries, and which will not make a user code up a second lock based solution, and not force "stop the world" operations.

In accordance with the new transactional memory system design, an "assist thread" is used to improve a Hybrid Transactional Memory System (Hybrid™). The system uses a combination of an "assist thread", additional hardware in the microprocessor, and a new software lock table, a Transaction Conflict Detection Table (TCDT), as an alternative replacement for the prior art a Software Transactional Memory (STM) system. The combination of the assist thread and software lock table allow the invention to achieve the same benefits of the prior-art use of a fallback STM without the high software overhead associated with STMs.

The new Transaction Conflict Detection Table (TCDT) managed by the assist thread facility is provided for the operating system (OS or Hypervisor). The table is used to provide locks on particular memory addresses currently in use by all transactions in the system. The current invention uses this new software table when the Hardware Transactional Memory (HTM) hardware is unable to process transactions due to any number of reasons (such as a cache overflow or unsupported operation).

One assist thread is provided for each CPU microprocessor core in the system. The assist thread is provided access to all of the addresses being processed in the load/store unit of the core. This flow of address information allows the assist thread to manage the new software lock table and provide "fallback" locks for all transactions in the system.

In the current invention, the assist thread is only used when the HTM system is unable to handle a particular transaction. When a single HTM based transaction exceeds the limits of the hardware, the whole system must transition to the use of the assist threads. The current invention provides a method to achieve this Hybrid TM behavior.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution which provides a method for fault injection verification as a computer process without manual intervention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 shows the format of the Transaction Conflict Detection Table (TCDT).

The detailed description explains the preferred embodiments of the invention, together with advantages and features, by way of example with reference to the drawings.

DETAILED DESCRIPTION OF THE INVENTION

1. Turning now to the drawings in greater detail, it will be appreciated that in FIG. 1 there is illustrated the computing system illustrating an embodiment of a Hybrid Transactional Memory System which is illustrated by use of a plurality of CPUs as a multiprocessor system with modules 1 . . . n, illustrated by CPUs 1 . . . n (100, 101 . . . 102), coupled to a system physical memory array (120) as well as other I/O devices (122) via a high speed interconnection element (110). Like other CPUs today, a CPU(computer processing unit) is integrated as in a multi-chip module with microprocessors which contain or are coupled in the CPU module to a memory controller, cache controllers, cache memory, and other components which form part of the CPU which connects to the high speed interconnect. The high speed interconnect functions under the architecture and operating system to interconnect elements of the computer system with physical memory, various I/O, devices and the other CPUs of the system. An example of such a system is U.S. patent Ser. No. 11/928,758 filed Oct. 30, 2007 entitled "Transactional Memory System which employs thread assists using address history tables", which is a continuation-in-part of application Ser. No. 11/748,044 filed on May 14, 2007, both applications being fully incorporated herein by reference in their entirety. The current invention however does not require the PTAM features of those earlier applications (although they can be present) but provides improvements for the CPU modules which are described in FIGS. 3-7 herein. Here a hybrid transactional memory system, comprising a plurality of the CPU microprocessors uses hardware transactional memory (HTM) transactions having transactional memory space accessible by the one or more of said CUP microprocessors via a high speed interconnect uses the hybrid transactional memory system's (Hybrid™) assist thread facility and software lock table coordination mechanism of FIGS. 3, 4, and 5 configured to coordinate execution of transactions over the shared transactional memory space without the use of a full software transactional memory (STM).

Figures 2, 3:
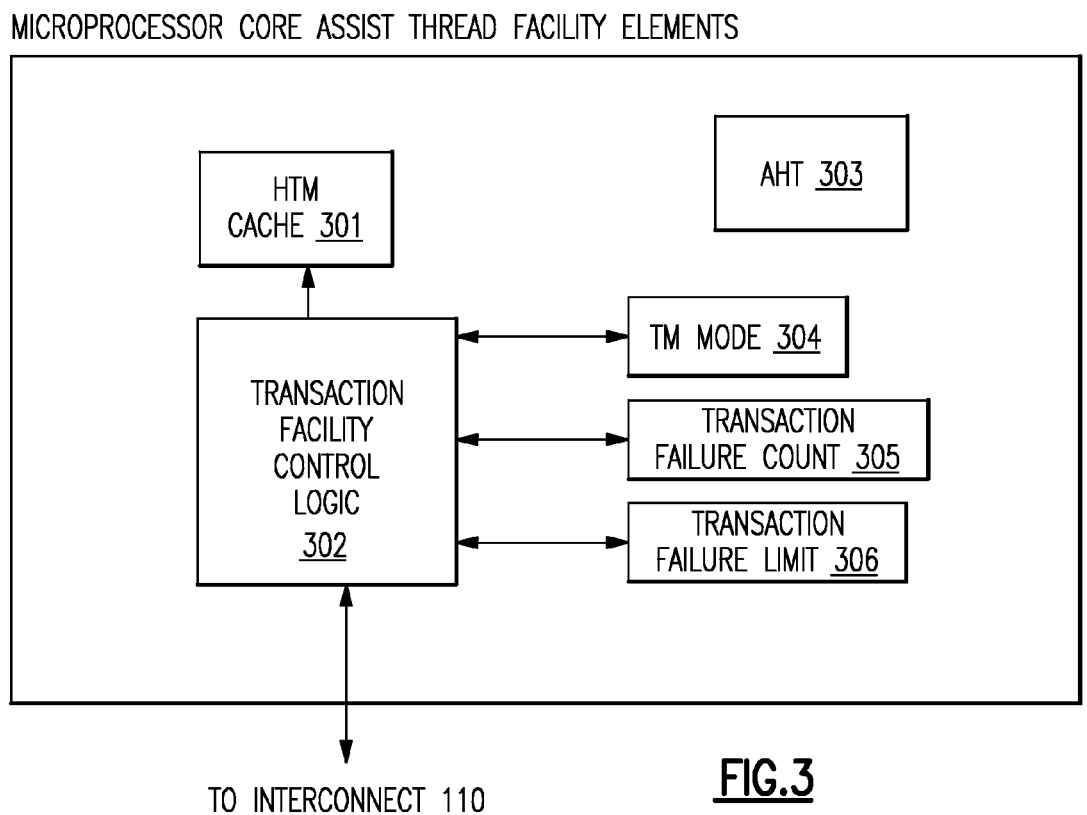
FIG. 2 illustrates one example of nested transactional code.
FIG. 3 shows the hybrid transactional memory assist thread facility elements of the Hybrid Transactional Memory System added to the multi-chip module CPU supporting the new Hybrid™.

In the hardware assist thread facility of the Hybrid Transactional Memory System illustrated by FIG. 3, the CPU multi-chip modules includes either as part of the core microprocessors contained therein or as an assist chip the additional elements illustrated by the CPU 100, additional assist thread facility hardware for each microprocessor core as detailed in FIG. 3, which is also duplicated in other CPUs 1 . . . n (101 and 102), so they have new counters and registers enabling the features described herein.

Figure 1:
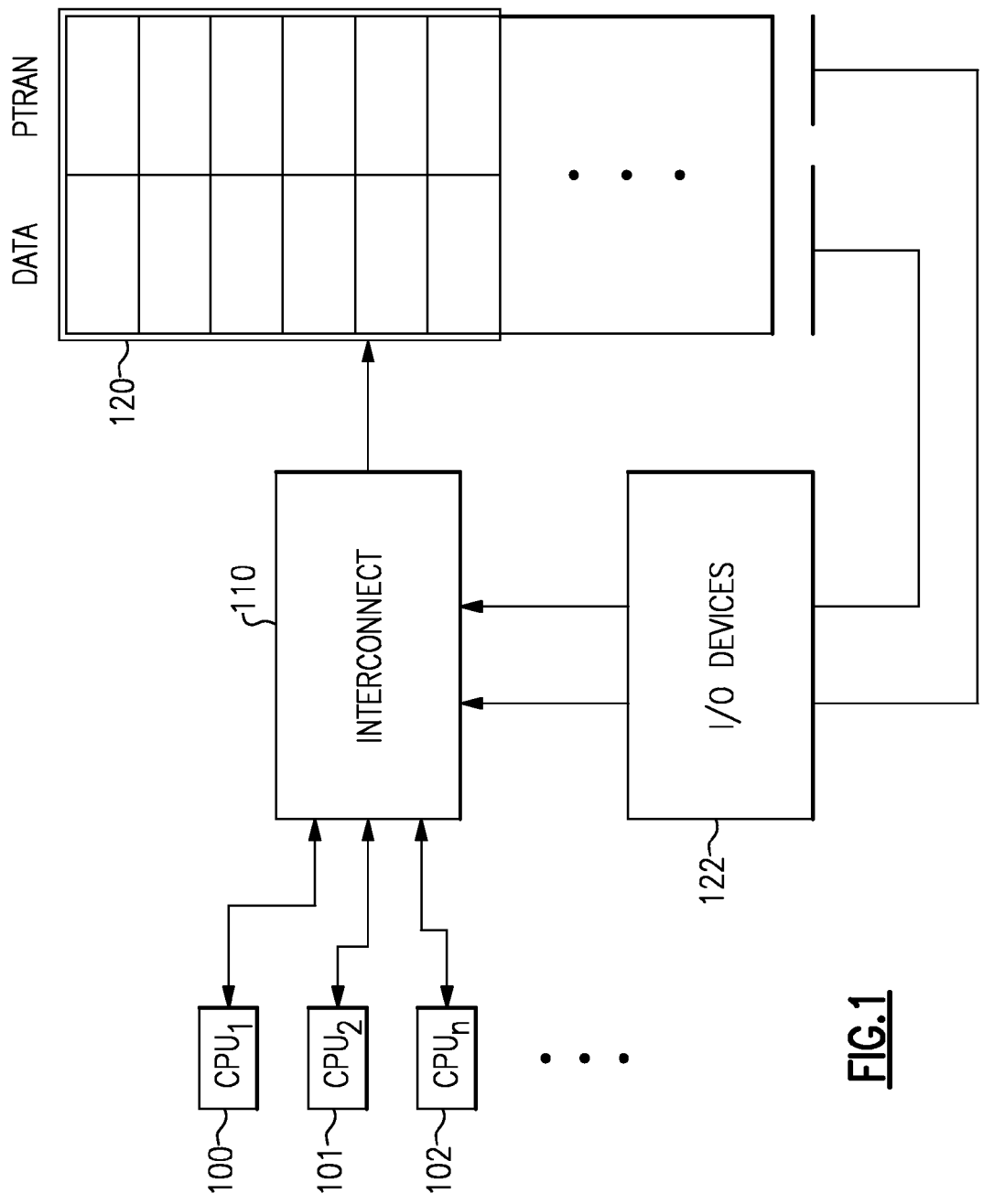
FIG. 1 illustrates one example a Hybrid Transactional Memory System.

As illustrated in FIG. 1 the physical memory array stores transaction data (121) in real system memory. The high speed interconnection element (110) can be implemented as a shared bus using IBM's elastic interface or by crossbar switch. The invention applies to systems which use any other scheme of interconnection physical memory to a multiprocessor system which may be implemented in one or more chips which provide the core microprocessors. The memory could be broken down into smaller portions and distributed across private connections to each of the CPU chips as done for the IBM Systems using the Power4 microprocessor or for some Intel and AMD Opteron based servers. The CPU microprocessors and memory controllers may be located together on a single silicon chip or they may be spread across multiple chips, but in the preferred embodiment each multi-chip module for a CPU has its own memory controller. The physical memory of the computing system is divided into n increments The Hybrid Transactional Memory System allows programmers to use their own transactional code and to include calls to existing software libraries inside of their transactions, and to use instructions used in other transactional memory systems. For instance, the nested routine illustrated in FIG. 2 can be executed. Instructions (TBEGIN, TEND) as illustrated by the Nested code sequence of FIG. 2 are used to mark the beginning and end of a group of instructions. The instructions which execute between the new instructions are sometimes referred to as an "atomic instruction group" (AIG) illustrated by threads of instructions shown in FIG. 2 (Instruction A0, Instruction A1, Instruction A2). The instruction sequence also can be nested threads, as specifically shown in FIG. 2, where a call can be included.

Additional storage access rules are used when a processor is executing instructions which are part of an atomic instruction group or threads. The system provides a way for hardware to quickly detect potential conflicts between the storage accesses of multiple instruction groups or threads. Although the system uses special new instructions such as BEGIN and END (TBEGIN and TEND) to mark the boundaries of a transaction, any other method could be used to identify a group of memory locations that are to be updated in an atomic fashion. The system is compatible with any number of software interfaces that may be used to implement a transactional memory system. The system can provide the same fast conflict detection for any system which is attempting to provide an atomic update of multiple storage locations. This also applies to systems which mark the boundaries of an instruction group in any other ways, including compiler generated hints attached to other instructions, internal microprocessor commands generated by internal microcode or millicode.

Figure 4:
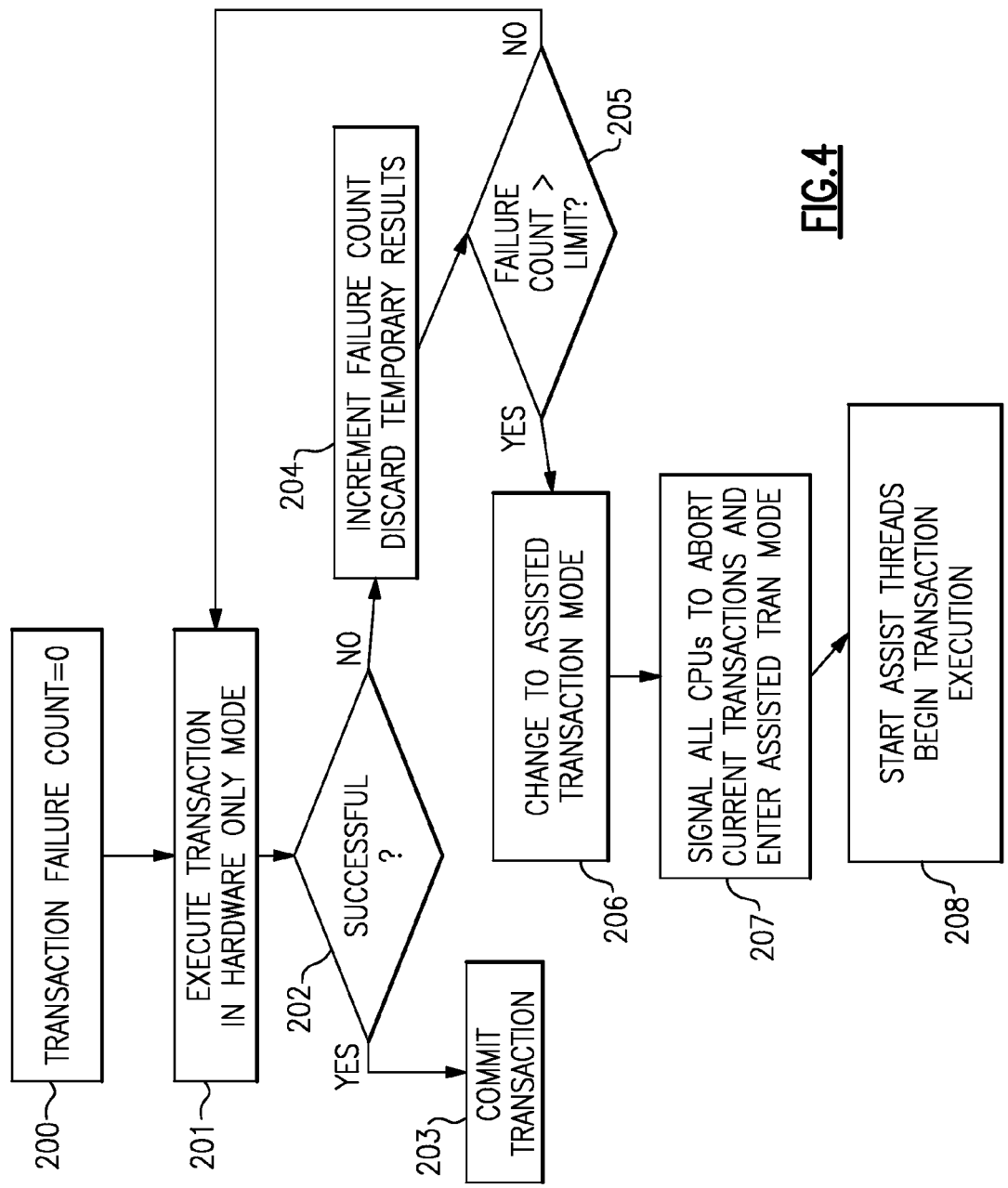
FIG. 4 shows the assist thread facilty's control of the setting of the TM Mode for a CPU.

FIGS. 3 and 4 illustrate the hardware and function of the assist thread facility, which manages the software table of FIG. 5. One assist thread facility is provided for each CPU microprocessor core in the system. The assist thread is provided access to all of the addresses being processed in the load/store unit of the core. This flow of address information allows the assist thread facility to manage the new software lock table and provide "fallback" locks for all transactions in the system.

In the current invention, an assist thread is only used when the HTM system is unable to handle a particular transaction. When a single HTM based transaction exceeds the limits of the hardware, the whole system must transition to the use of the assist threads. The current invention provides a method to achieve this Hybrid TM behavior.

Turning now to the drawings in greater detail, it will be seen that in FIG. 3 illustrates one of the microprocessor CPUs of a multiprocessor system with a plurality of CPUs 1 . . . n, each connected to a bus, as in FIG. 1, in accordance with this improved computer system using a high speed interconnect.

As illustrated in FIG. 3, which shows the elements of a CPU 100, provides for each of the microprocessor cores of the CPU 100 an additional assist thread facility elements, or an additional assist thread facility chip for the CPU, as the illustrated part of the CPU additional hybrid transactional memory assist thread facility elements illustrated below the traditional CPU elements (100) (microprocessor cores, cache, cache controller, clock controller, memory controller, load/store control logic, interface) provided in FIG. 3. The assist thread facility of each CPU includes a HTM cache (301) memory for the CPU (such as 100 which has included therein a memory controller, cache controllers, cache memory, and other components which form part of the CPU which connects to the high speed interconnect 110), the transactional facility control logic (302) and an Address History Table (303) coupled to load and store units for writing information entries of the microprocessor (100) in the AHT by the CPU's memory controller load store controls and coupled via instruction execution pipelines of the CPU (100) for writing information into the AHT. The Transaction Facility Control Logic (302) enables the transactional memory hardware to move into an assisted transaction mode of operation using the hardware and software controls of the assist thread's transaction facility control logic (302).

Each CPU has the ability to execute transactional memory instructions TBEGIN and TEND. The CPU's HTM memory cache (301) has a hardware cache design that supports under the logic provided by the Transactional Facility Control Logic (302) the ability to detect conflicts, abort failed transactions and quickly discard partially completed transactional results.

A TM mode register (304) of the hybrid transactional memory elements of the assist thread facility for a CPU 100 is added which enables the CPU to treat transactional memory operations in 2 different ways. When the mode register is set to 0, the CPU uses a Hardware Transactional Memory (HTM) method restricting execution only to hardware. When the mode register is set to 1, the CPU operates in an "Assisted Transaction Mode". The control of the setting of the TM Mode is described in detail in FIG. 4.

The hybrid transactional memory elements of a CPU also contains a register (305) bi-directionally coupled to the Transactional Facility Control Logic (302) to be used as a Transaction Failure Counter (305). In the preferred embodiment a special purpose register (305) is provided for this purpose, other implementations of the hybrid transactional memory elements may use a location in main memory to hold the count or may provide another form of scratch registers.

The hybrid transactional memory elements for a CPU 100 also includes a Transactional Failure Limit (306) which is another special purpose register (306) coupled to the Transactional Facility Control Logic (302) to be used as a Transaction Failure Limit (306). Again, other implementations of the hybrid transactional memory elements may use a location in main memory to hold the limit or may provide another form of scratch registers.

Turning now to FIG. 4, it will be seen that when a transaction is executed for the first time, the Transaction Failure Count is set to 0 (200). The execution of the transaction is started (201) in hardware only mode (HTM). A decision (202) is made based on the outcome of the transaction execution. If the hardware does not detect a conflict for the storage locations accessed by the transaction and the transaction does not exceed the hardware limits and the transaction does not attempt to use system operations that are prohibited inside of transactions, the transactions is declared "successful" and the results of the instructions executing in the transaction are "committed" (203) to the architectural state of the system. If a conflict was detected or an abort was indicated, the transaction fails and the Transaction Failure Count register is incremented (204) and the temporary results of the partially executed transaction are discarded. The Failure Count is then compared against a Failure Count Limit recorded in a register (306) for that purpose and a decision (205) is made based upon this comparison. If the Failure Count does not exceed the limit the transaction is tried again (201) in the same Hardware HTM Mode.

If the Failure Count exceeds the limit value in the Transactional Facility Control Logic (302) stored in the Transaction Failure Limit (306) then the TM Mode is changed to 1 and the CPU enters the Assisted Transaction Mode (207). In the preferred embodiment this change of mode includes the starting of the "assist thread of execution" (208). This is accomplished via an operating system interface. Other embodiments may leave the assist thread active in the pool of threads.

While operating in Assisted Transaction Mode, a software table is used to keep track of possible conflicts between transactions. In the preferred embodiment one table is used for all transactions. As has been noted before, the new Transaction Conflict Detection Table (TCDT) managed by the assist thread facility is provided for the operating system (OS or Hypervisor). The table is used to provide locks on particular memory addresses currently in use by all transactions in the system. The current invention uses this new software table when the Hardware Transactional Memory (HTM) hardware is unable to process transactions due to any number of reasons (such as a cache overflow or unsupported operation).

The table may be cached, hashed, duplicated, and shadowed. FIG. 5 shows the format of this Transaction Conflict Detection Table (TCDT). One row of the TCDT is used for each real page (4 KB) of system memory. Other embodiments may use a different granularity. The optimal choice of TCDT row granularity depends on many factors including expected transaction behavior and system memory size.

In the preferred embodiment, each row of the TCDT has room for four Process IDs (only 3 are shown) (320a,320b, 320c) included with the Process ID is an indication of whether that process made the entry for a "favored" transaction. A read/write indication and a line number is provided for each Process ID (330a,330b,330c). The line number to indicate which line in the page has been referenced by the associated process whose id is written into the Process ID field. (A line number of xxxx indicates that the process has registered an interest in the whole page). These entries provide the ability for a transaction to "register" its read/write set into the TCDT. The granularity of the table does not need to match the granularity of the hardware TM detection.

Now, the current invention uses this new software when the TCDT table when the Hardware Transactional Memory (HTM) hardware is unable to process transactions due to any number of reasons, like cache overflow and unsupported operations.

Figure 6:
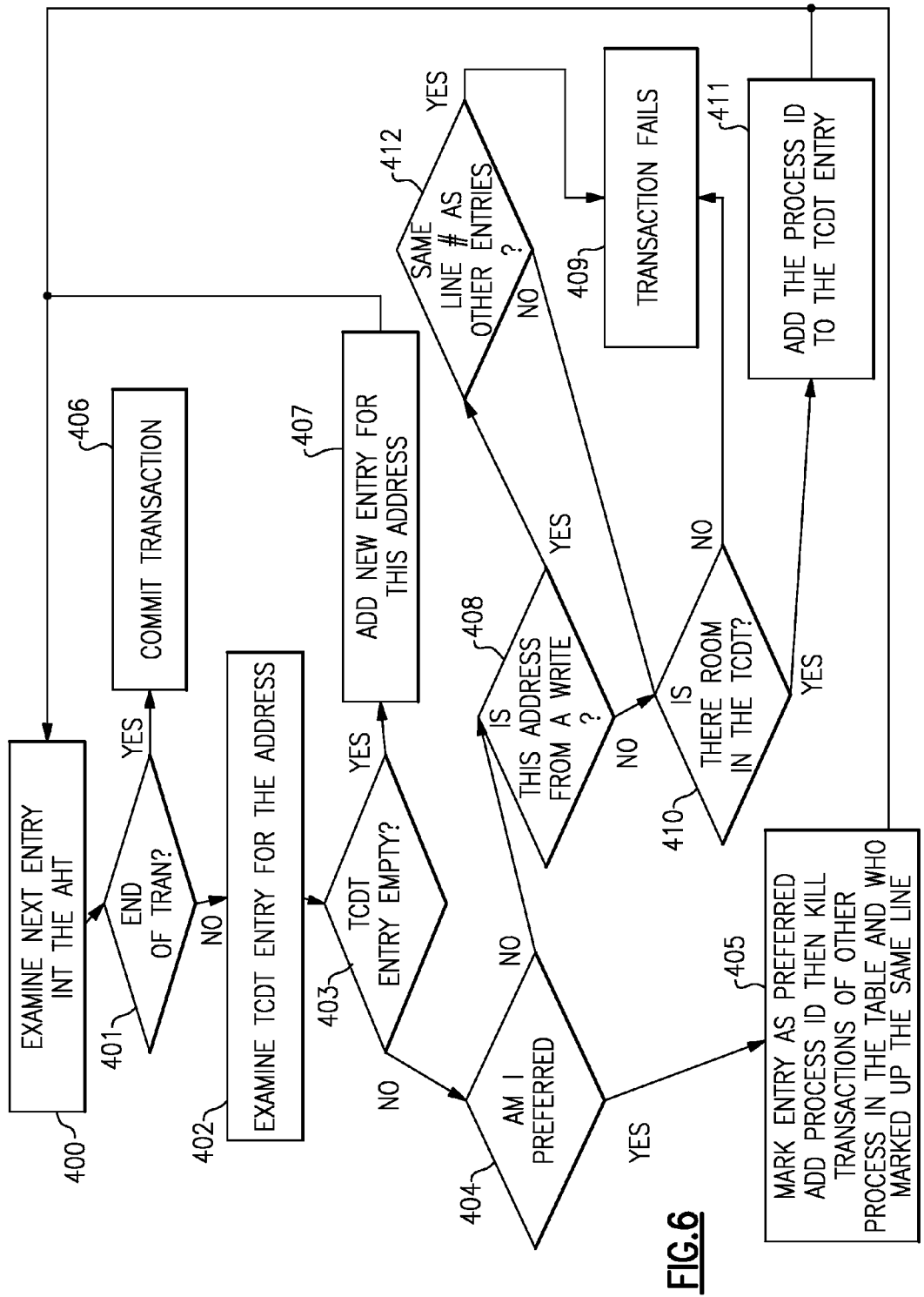
FIG. 6 illustrates how the assist thread and the TCDT are used together to provide a conflict detection function.

FIG. 6 shows how the assist thread facility and the TCDT are used together to provide a conflict detection function. This software table based conflict detection is used as a backup to the limited hardware based transactional memory conflict detection. The steps of FIG. 6 are only used for transactions that have failed repeatedly in the hardware TM mode. The assist thread of the assist thread facility operates as described in the referenced U.S. patent Ser. No. 11/928,758 filed Oct. 30, 2007 entitled "Transactional Memory System which employs thread assists using address history tables". Thus, after a TBEGIN instructions is executed, the addresses are written into the Address History Table, and also, the addresses are pulled out of the AHT by the assist thread and processed.

Each address is examined (400) and it is determined whether the system has reached the end of the current transaction (401). If the end of the transaction has been reached the temporary results of the transaction are committed (406). The preferred embodiment places the new data in main storage so that the commit is very fast.

But, in the current embodiment, if the end of a transaction has not been reached then the Transaction Conflict Detection Table (TCDT) is accessed (402) using the high order address bits of the address that was read out of the AHT. It is now determined whether a new entry is required in the TCDT for this address. The high order bits of the address are used to index into the table and a read of a row. The current embodiment uses one row per 4K main storage page. If the row is empty (403) then the process ID of the owning transaction is placed in the table along with an indication of whether the process is "favored". If the row already has an entry, the entry is examined further. Is it then determined (404) whether the current transaction is "favored". If the current transaction is favored then the TCDT entry for it is marked as favored (405). Any other processes that have a write entry for the same line in the page are killed. If the current update is for a write then it is necessary to kill all transactions that have registered either a read or a write for the same line.

If the current transaction is not favored then the assist thread then determines whether the address is from a write (408). If it is a write, the TCDT entry is examined to determine if there is already an entry from another process ID for the same line. If there is then the current transaction fails. If there is not then a new entry is made for the current process. If there isn't room, the transaction fails.

If the address is not from a write it is determined whether there is room in the TCDT (410). If there is room, the current process ID is added to the TCDT entry (411). The assist thread then continues with the next AHT entry (400).

When the transaction is completed the entries in the table are removed. A per-transaction list of all the addresses touched is used to quickly find the entries that need to be removed. They can be removed in a "lazy" fashion, the only impact will be an over-indication of the conflict cases and some additional use of the favored transaction mechanism.

Figure 7:
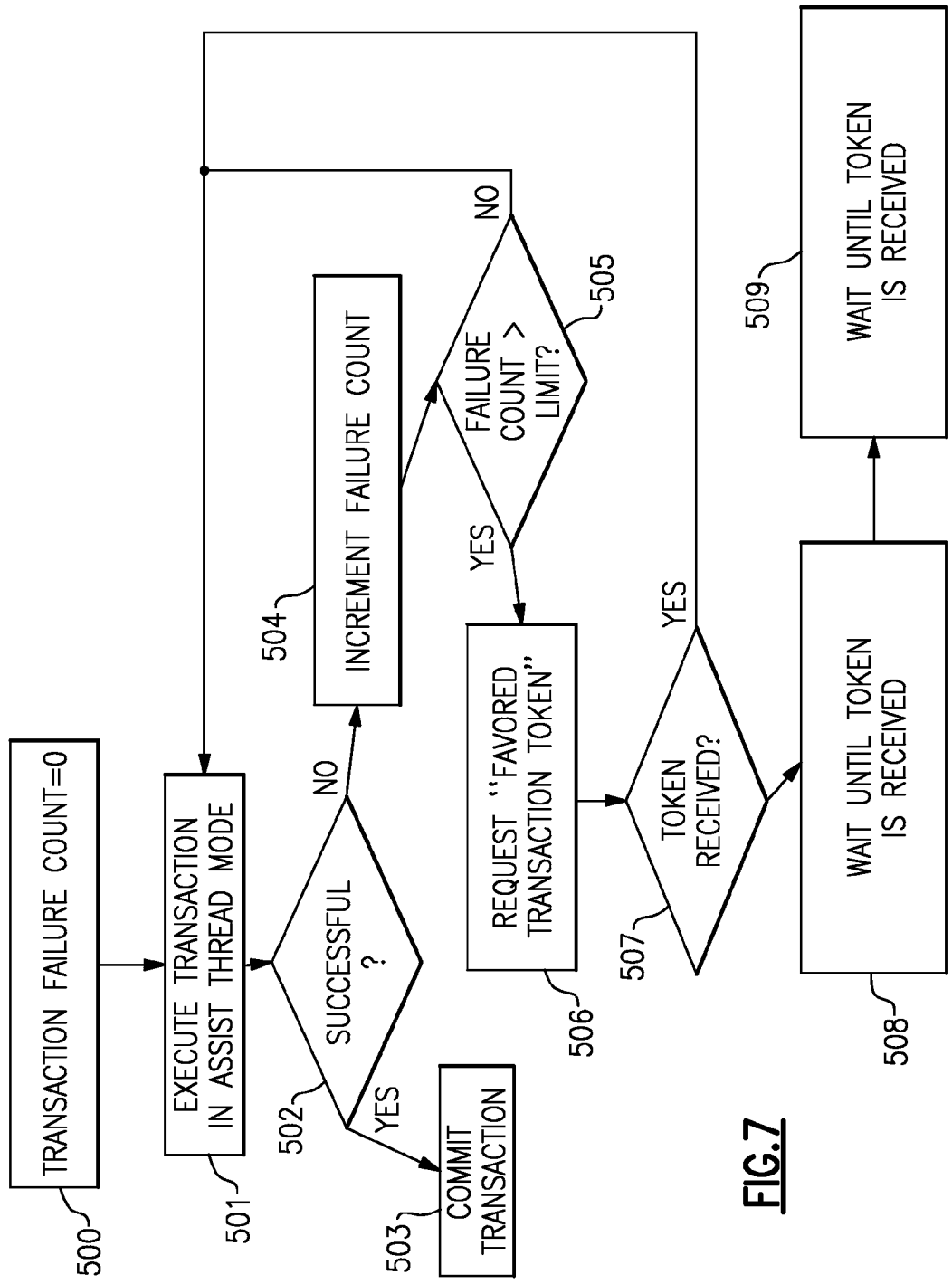
FIG. 7 shows assist thread execution of a transaction.

FIG. 6 showed that there are several ways for the assisted transaction execution to fail, mainly due to conflicts over the read and write set of multiple transactions executing concurrently in the system. Repeated failures may cause a deadlock condition. FIG. 7 shows how the current invention prevents deadlocks by using the favored transaction state and the favored entries in the TCDT.

Turning now to FIG. 7, it will be seen that the assist thread execution of a transaction begins with the resetting of the Transaction Failure Count to 0 (500). The Transaction Failure Count may be kept in a register or in memory that is accessed by the assist thread. Execution of a transaction only gets to this point after the HTM system has failed repeatedly. The system then executes the transaction in the Assist Thread Mode (501) using the steps previously described in FIG. 6. It is determined whether the assisted execution of the transaction is successful (502), if so the temporary state of the transaction is committed to the architectural state of the system (503). If the assisted execution fails then the Failure Count is incremented (504). A decision is made (505) based on the Failure Count and a Limit. If the limit has not been reached the transaction is executed again (501). If the limits are reached after repeated failures of the assisted execution of the transaction the assist thread will request a "Favored Transaction Token" (FTT) (506). Only one process thread in the system is granted the FTT at one time. If the token is not currently available (507) and is therefore not received the assist thread will wait until the token is received (508). Once the token is received, execution continues (509) and the current transaction is guaranteed to succeed. A process which holds the FTT while performing an assisted transaction execution is favored during all conflicts in the TCDT.

A computer program which embodies a process described herein is stored on at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified according to the order of importance of the heuristic steps, in order to perform the described functions. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for execution of a current transaction on a hybrid transactional memory system having a hardware transactional memory (HTM) system provided for a plurality of CPUs (computer processing units) of the system, comprising:

initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;

continuing execution of the current transaction based on the CPU being in the first mode, in the first mode the CPU remaining based on the HTM system handling the current transaction;

coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;

starting the execution of a first transaction for the first time in HTM mode, based on each of the plurality of CPUs having coupled to said transactional facility control logic a transaction failure counter for holding a failure count, and a transaction failure limit register for holding a limit value;

making a decision based on the outcome of the first transaction execution based on the HTM not detecting a conflict for the storage locations accessed by the first transaction and the first transaction not exceeding the hardware limits of the transaction failure limit register and the first transaction does not attempt to use system operations that are prohibited inside of a plurality of transactions;

declaring the plurality of transactions successful and the results of the instructions executing in the first transaction being committed to the architectural state of the system; and failing the first transaction and incrementing the transaction failure count register based on a conflict being detected or an abort being indicated, and the temporary results of a partially executed first transaction are discarded, and a failure count is compared against a recorded failure count limit and a decision is made based upon the comparison, and based on the failure count not exceeding the limit, the first transaction is tried again in the HTM mode.

2. A computer implemented method for execution of a current transaction on a hybrid transactional memory system having a hardware transactional memory (HTM) system provided for a plurality of CPUs (computer processing units) of the system, comprising:

initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;

continuing execution of the current transaction based on the CPU being in the first mode, in the first mode the CPU remaining based on the HTM system handling the current transaction;

coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;

entering an assisted transaction mode starting an assist thread of execution in the CPU, each of which has coupled to the CPU's transactional facility control logic; and holding a failure count by a transaction failure counter based on the failure count exceeding a limit value in the transactional facility control logic stored in a transaction failure limit register.

3. A computer implemented method for execution of a current transaction on a hybrid transactional memory system having a hardware transactional memory (HTM) system provided for a plurality of CPUs (computer processing units) of the system, comprising:

initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;

continuing execution of the current transaction based on the CPU being in the first mode, in the first mode the CPU remaining based on the HTM system handling the current transaction;

coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;

using a transaction conflict detection table (TCDT) managed by the assist thread facility for keeping track of possible conflicts between transactions and running current transactions that have repeatedly failed before the end of the current transaction has not been reached;

accessing the TCDT for determining whether the current transaction is favored;

based on the current transaction being favored marking the TCDT entry for it as favored;

terminating any other processes that have a write entry for the same line in the page; and terminating, based on an update being for a write, all transactions that have registered either a read or a write for the same line.

4. A computer implemented method for execution of a current transaction on a hybrid transactional memory system having a hardware transactional memory (HTM) system provided for a plurality of CPUs (computer processing units) of the system, comprising:

initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;

continuing execution of the current transaction based on the CPU being in the first mode, in the first mode the CPU remaining based on the HTM system handling the current transaction;

coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;

using a transaction conflict detection table (TCDT) managed by the assist thread facility for keeping track of possible conflicts between transactions and running current transactions that have repeatedly failed based on the end of the current transaction not being reached;

accessing the TCDT for determining whether the current transaction not favored; and based on the current transaction being not favored, making a determination whether the address of the current transaction is from a write, and, based on the current transaction being from a write and the TCDT entry already showing an entry from another process ID in the same line, failing the current transaction, but based on there being room, instead making a new entry for the current transaction.

5. A computer implemented method for execution of a current transaction on a hybrid transactional memory system having a hardware transactional memory (HTM) system provided for a plurality of CPUs (computer processing units) of the system, comprising:
- initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;
- continuing execution of the current transaction based on the CPU being in the first mode, in the first mode the CPU remaining based on the HTM system handling the current transaction;
- coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;
- preventing deadlocks using a favored transaction state and favored entries in the TCDT, as, based on an assist thread execution of a transaction beginning and it determining whether the assisted execution of the transaction is successful;
- based on determining the transaction is successful, committing the temporary state of the transaction to the architectural state of the system;
- based on the assisted execution failing, incrementing a failure count, and making a decision based on the failure count and a limit, whether the transaction is executed again or whether the transaction will request a "Favored Transaction Token" (FTT);
- based on the FTT token not being currently available and therefore not received, suspending the assist thread to wait until the token is received; and
- continuing execution as the transaction is guaranteed to succeed based on receiving an FFT token, as a transaction process for holding the FTT while performing an assisted transaction execution is favored during all conflicts in the TCDT.

6. A computer program product for execution of a current transaction on a hybrid transactional memory system having a hardware transactional memory (HTM) system provided for a plurality of CPUs (computer processing units) of the system, the computer program product comprising:
- a non-transitory tangible storage medium readable by a processing circuit and storing instructions for execution by the processing circuit for performing a method comprising:
- initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;
- continuing execution of the current transaction based on the CPU being in the first mode, in the first mode the CPU remaining based on the HTM system handling the current transaction;
- coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;
- starting the execution of a first transaction for the first time in HTM mode, based on each of the plurality of CPUs having coupled to said transactional facility control logic a transaction failure counter for holding a failure count, and a transaction failure limit register for holding a limit value;
- making a decision based on the outcome of the first transaction execution based on the HTM not detecting a conflict for the storage locations accessed by the first transaction and the first transaction not exceeding the hardware limits of the transaction failure limit register and the first transaction does not attempt to use system operations that are prohibited inside of a plurality of transactions;
- declaring the plurality of transactions successful and the results of the instructions executing in the first transaction being committed to the architectural state of the system; and
- failing the first transaction and incrementing the transaction failure count register based on a conflict being detected or an abort being indicated, and the temporary results of a partially executed first transaction are discarded, and a failure count is compared against a recorded failure count limit and a decision is made based upon the comparison, and based on the failure count not exceeding the limit, the first transaction is tried again in the HTM mode.

7. A computer program product for execution of a current transaction on a hybrid transactional memory system having a hardware transactional memory (HTM) system provided for a plurality of CPUs (computer processing units) of the system, the computer program product comprising:
- a non-transitory tangible storage medium readable by a processing circuit and storing instructions for execution by the processing circuit for performing a method comprising:
- initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;
- continuing execution of the current transaction based on the CPU being in the first mode, in the first mode the CPU remaining based on the HTM system handling the current transaction;
- coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;
- entering an assisted transaction mode starting an assist thread of execution in the CPU, each of which has coupled to the CPU's transactional facility control logic; and
- holding a failure count by a transaction failure counter based on the failure count exceeding a limit value in the transactional facility control logic stored in a transaction failure limit register.

8. A computer program product for execution of a current transaction on a hybrid transactional memory system having a hardware transactional memory (HTM) system provided for a plurality of CPUs (computer processing units) of the system, the computer program product comprising:
  a non-transitory tangible storage medium readable by a processing circuit and storing instructions for execution by the processing circuit for performing a method comprising:
  initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;
  continuing execution of the current transaction based on the CPU being in the first mode, in the first mode the CPU remaining based on the HTM system handling the current transaction;
  coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;
  using a transaction conflict detection table (TCDT) managed by the assist thread facility for keeping track of possible conflicts between transactions and running current transactions that have repeatedly failed before the end of the current transaction has not been reached;
  accessing the TCDT for determining whether the current transaction is favored;
  based on the current transaction being favored marking the TCDT entry for it as favored;
  terminating any other processes that have a write entry for the same line in the page; and
  terminating, based on an update being for a write, all transactions that have registered either a read or a write for the same line.

9. A computer program product for execution of a current transaction on a hybrid transactional memory system having a hardware transactional memory (HTM) system provided for a plurality of CPUs (computer processing units) of the system, the computer program product comprising:
  a non-transitory tangible storage medium readable by a processing circuit and storing instructions for execution by the processing circuit for performing a method comprising:
  initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;
  continuing execution of the current transaction based on the CPU being in the first mode, in the first mode the CPU remaining based on the HTM system handling the current transaction;
  coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;
  using a transaction conflict detection table (TCDT) managed by the assist thread facility for keeping track of possible conflicts between transactions and running current transactions that have repeatedly failed based on the end of the current transaction not being reached;
  accessing the TCDT for determining whether the current transaction not favored; and
  based on the current transaction being not favored, making a determination whether the address of the current transaction is from a write, and, based on the current transaction being from a write and the TCDT entry already showing an entry from another process ID in the same line, failing the current transaction, but based on there being room, instead making a new entry for the current transaction.

10. A computer program product for execution of a current transaction on a hybrid transactional memory system having a hardware transactional memory (HTM) system provided for a plurality of CPUs (computer processing units) of the system, the computer program product comprising:
  a non-transitory tangible storage medium readable by a processing circuit and storing instructions for execution by the processing circuit for performing a method comprising:
  initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;
  continuing execution of the current transaction based on the CPU being in the first mode, in the first mode the CPU remaining based on the HTM system handling the current transaction;
  coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;
  preventing deadlocks using a favored transaction state and favored entries in the TCDT, as, based on an assist thread execution of a transaction beginning and it determining whether the assisted execution of the transaction is successful;
  based on determining the transaction is successful, committing the temporary state of the transaction to the architectural state of the system;
  based on the assisted execution failing, incrementing a failure count, and making a decision based on the failure count and a limit, whether the transaction is executed again or whether the transaction will request a "Favored Transaction Token" (FTT);
  based on the FTT token not being currently available and therefore not received, suspending the assist thread to wait until the token is received; and
  continuing execution as the transaction is guaranteed to succeed based on receiving an FFT token, as a transaction process for holding the FTT while performing an assisted transaction execution is favored during all conflicts in the TCDT.

11. A computer system for execution of a current transaction on a hybrid transactional memory system, the system comprising:
  a plurality of CPUs (computer processing units);
  a hardware transactional memory (HTM) system provided for the plurality of CPUs of the system, the system configured to perform a method comprising:

initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;

continuing execution of the current transaction based on the CPU being in the first mode, in the first mode the CPU remaining based on the HTM system handling the current transaction;

coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;

starting the execution of a first transaction for the first time in HTM mode, based on each of the plurality of CPUs having coupled to said transactional facility control logic a transaction failure counter for holding a failure count, and a transaction failure limit register for holding a limit value;

making a decision based on the outcome of the first transaction execution based on the HTM not detecting a conflict for the storage locations accessed by the first transaction and the first transaction not exceeding the hardware limits of the transaction failure limit register and the first transaction does not attempt to use system operations that are prohibited inside of a plurality of transactions;

declaring the plurality of transactions successful and the results of the instructions executing in the first transaction being committed to the architectural state of the system; and failing the first transaction and incrementing the transaction failure count register based on a conflict being detected or an abort being indicated, and the temporary results of a partially executed first transaction are discarded, and a failure count is compared against a recorded failure count limit and a decision is made based upon the comparison, and based on the failure count not exceeding the limit, the first transaction is tried again in the HTM mode.

12. A computer system for execution of a current transaction on a hybrid transactional memory system, the system comprising:

a plurality of CPUs (computer processing units);

a hardware transactional memory (HTM) system provided for the plurality of CPUs of the system, the system configured to perform a method comprising:

initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;

continuing execution of the current transaction based on the CPU being in the first mode, in the first mode the CPU remaining based on the HTM system handling the current transaction;

coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;

entering an assisted transaction mode starting an assist thread of execution in the CPU, each of which has coupled to the CPU's transactional facility control logic; and holding a failure count by a transaction failure counter based on the failure count exceeding a limit value in the transactional facility control logic stored in a transaction failure limit register.

13. A computer system for execution of a current transaction on a hybrid transactional memory system, the system comprising:

a plurality of CPUs (computer processing units);

a hardware transactional memory (HTM) system provided for the plurality of CPUs of the system, the system configured to perform a method comprising:

initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;

continuing execution of the current transaction based on the CPU being in the first mode, in the first mode the CPU remaining based on the HTM system handling the current transaction;

coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;

using a transaction conflict detection table (TCDT) managed by the assist thread facility for keeping track of possible conflicts between transactions and running current transactions that have repeatedly failed before the end of the current transaction has not been reached;

accessing the TCDT for determining whether the current transaction is favored;

based on the current transaction being favored marking the TCDT entry for it as favored;

terminating any other processes that have a write entry for the same line in the page; and terminating, based on an update being for a write, all transactions that have registered either a read or a write for the same line.

14. A computer system for execution of a current transaction on a hybrid transactional memory system, the system comprising:

a plurality of CPUs (computer processing units);

a hardware transactional memory (HTM) system provided for the plurality of CPUs of the system, the system configured to perform a method comprising:

initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;

continuing execution of the current transaction based on the CPU being in the first mode, in the first mode the CPU remaining based on the HTM system handling the current transaction;

coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;

using a transaction conflict detection table (TCDT) managed by the assist thread facility for keeping track of possible conflicts between transactions and running current transactions that have repeatedly failed based on the end of the current transaction not being reached;

accessing the TCDT for determining whether the current transaction not favored; and based on the current transaction being not favored, making a determination whether the address of the current transaction is from a write, and, based on the current transaction being from a write and the TCDT entry already showing an entry from another process ID in the same line, failing the current transaction, but based on there being room, instead making a new entry for the current transaction.

15. A computer system for execution of a current transaction on a hybrid transactional memory system, the system comprising:

a plurality of CPUs (computer processing units);

a hardware transactional memory (HTM) system provided for the plurality of CPUs of the system, the system configured to perform a method comprising:

initiating the current transaction for a CPU having a mode register which enables a CPU for treating transactional memory operations in two different modes, the two different modes including a first mode causing the CPU to use a HTM mode, and a second mode causing the CPU configured to operate in an assisted transaction mode;

continuing execution of the current transaction based on the CPU being in the first mode, in the first mode the CPU remaining based on the HTM system handling the current transaction;

coordinating execution of the current transaction and other transactions over shared transactional memory space with an assist thread facility that the CPU should operate in an assisted transaction mode, and based on the CPU operating in the assisted transaction mode determining the current transaction's continued execution by the assist thread facility and software lock table settings;

preventing deadlocks using a favored transaction state and favored entries in the TCDT, as, based on an assist thread execution of a transaction beginning and it determining whether the assisted execution of the transaction is successful;

based on determining the transaction is successful, committing the temporary state of the transaction to the architectural state of the system;

based on the assisted execution failing, incrementing a failure count, and making a decision based on the failure count and a limit, whether the transaction is executed again or whether the transaction will request a "Favored Transaction Token" (FTT);

based on the FTT token not being currently available and therefore not received, suspending the assist thread to wait until the token is received; and continuing execution as the transaction is guaranteed to succeed based on receiving an FFT token, as a transaction process for holding the FTT while performing an assisted transaction execution is favored during all conflicts in the TCDT.

* * * * *